United States Patent
Ridgway

[15] 3,668,190
[45] June 6, 1972

[54] POLYAMIDES CONTAINING THE O-PHENYLENEDIACETIC ACID MOICTY

[72] Inventor: James S. Ridgway, Pensacola, Fla.
[73] Assignee: Monsanto Company, St. Louis, Mo.
[22] Filed: Dec. 23, 1970
[21] Appl. No.: 101,133

Related U.S. Application Data

[63] Continuation-in-part of Ser. No. 751,729, Aug. 12, 1968, abandoned.

[52] U.S. Cl. .....................260/78 R, 260/33.4 R, 260/78 A, 260/78 L
[51] Int. Cl. .........................................................C08g 20/20
[58] Field of Search............................260/78 R, 78 A, 78 L

[56] References Cited

UNITED STATES PATENTS

| | | | |
|---|---|---|---|
| 2,130,523 | 9/1938 | Carothers | 260/78 R |
| 2,252,555 | 8/1941 | Carothers | 260/78 A |
| 2,268,586 | 1/1942 | Gilman | 260/78 R |
| 2,918,454 | 12/1959 | Graham | 260/78 R |
| 3,046,257 | 7/1962 | Evans et al. | 260/78 R |

*Primary Examiner*—Harold D. Anderson
*Attorney*—Stanley M. Tarter, John W. Whisler, Neal E. Willis and Elmer J. Fischer

[57] ABSTRACT

Polyamides modified to contain as an integral part of their polymer chain units represented by the structure

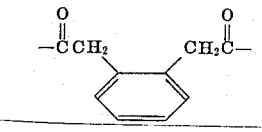

possess a red color and can be fabricated into shaped articles, such as fibers, to provide red articles without the aid of pigments or dyes.

4 Claims, No Drawings

POLYAMIDES CONTAINING THE O-PHENYLENEDIACETIC ACID MOICTY

This application is a continuation-in-part of application, Ser. No. 751,729, filed Aug. 12, 1968, now abandoned.

BACKGROUND OF THE INVENTION

Red-pigmented nylon, such as polyhexamethylene adipamide (nylon 66), in which the pigment or dye is added to the amide-forming components and then carried through the nylon polymerization, is difficult to obtain since few red pigments or dyes are sufficiently stable to withstand decomposition under the heat and pressure conditions encountered in the nylon polymerization. Decomposition of the pigment or dye results in discoloration of the material and consequently loss of the desired red color. Also, pigment added to the amide-forming components tends to agglomerate within the formed polymer resulting in degradation of the polymer physical properties.

SUMMARY OF THE INVENTION

In accordance with the present invention red fiber-forming polyamides are obtained without the use of pigments or dyes by preparing the polyamides in the presence of o-phenylene diacetic acid under conditions so as to form modified polyamides containing as an integral part of their polymer chain up to 10 mole percent of units represented by the structure

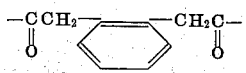

Polyamides can be obtained ranging in shade from light red (pink) to dark red (maroon) by varying the amount of o-phenylenediacetic acid incorporated therein from 0.01 to 10 mole percent, respectively. The red-colored polyamides embodied herein have a dominant wave length ranging from about 5,900 to about 6,200 angstroms and are obtained without the difficulties heretofore encountered with red dyes or pigments. Surprisingly, polyamides modified with para- or meta-phenylenediacetic are colorless.

DESCRIPTION OF THE PREFERRED EMBODIMENT

The polyamides of the present invention include any fiber-forming synthetic linear polycarbonamide in which up to 10 mole percent of the polymer chain consists of units of the structure

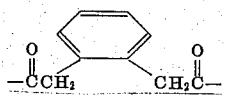

Conveniently, the polyamides may be regarded as modified polyamides wherein standard polyamide molecules have been modified to contain as an integral part thereof up to 10 mole percent of units of the structure

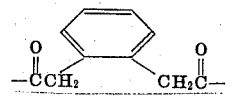

Polyamides which may be modified in accordance with the present invention are those formed by condensation of one or more diamines with one or more dicarboxylic acids, or by condensation of one or more aminoacids or lactams, or by condensation of a mixture of these components. The modified polyamides of the invention are conveniently prepared according to procedures well known in the art and employed in the manufacture of simple nylons by merely adding equimolar portions of a diamine and o-phenylenediacetic acid to the polyamide-forming components employed in forming the standard or unmodified polyamide. Alternatively the modified diamine/dicarboxylic acid condensation polyamides and the modified diamine/dicarboxylic acid/amino acid condensation polyamides may be prepared by replacing up to 10 mole percent, based on the total moles of components, of the dicarboxylic acid component with an equimolar amount of o-phenylene-diacetic acid. As used herein the term "modified polyamide" refers only to polyamides containing the

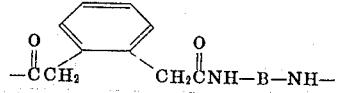

units; polyamides, for example, containing 90 mole percent

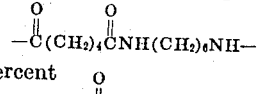

and 10 mole percent

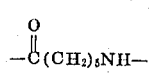

are considered unmodified or standard polyamides.

Representative diamines which may be employed in preparing the modified polyamides include those defined by the structure $NH_2-B-NH_2$ or the amide-forming derivatives thereof in which B is a hydrocarbon radical, such as: $-(CH_2)_n-$ in which n is 4 to 20;

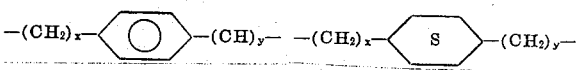

in which $x$ and $y$ are the same or different integer of from 0 to 16; fused ring radicals, e.g., naphthylene, anthrylene, etc.; and

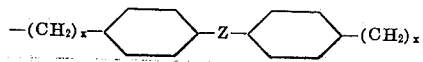

in which the rings may be aromatic or cycloaliphatic and Z is $-(CH_2)_x-$ or oxygen. Representative dicarboxylic acids include those represented by the structure $HOOC-A-COOH$ or the amide-forming derivatives thereof in which A is a hydrocarbon radical, such as

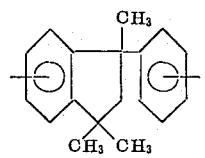

or one of the radicals described in defining B. Representative aminoacids or the amide-forming derivatives thereof include those defined by the structures $NH_2-R-COOH$ and

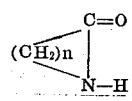

in which R is a $-(CH_2)_n-$ radical. Preferred components for use in preparing the polyamides described herein are those in which A, B and R are unbranched alkylene radicals having from four to 12 carbon atoms, such as $-(CH_2)_4-$, $-(CH_2)_5-$, $-(CH_2)_6-$, $-(CH_2)_8-$, $-(CH_2)_{10}-$, $-(CH_2)_{11}-$, $-(CH_2)_{12}-$, etc.

The polyamides embodied herein may contain the usual heat, light stabilizers and viscosity stabilizers.

To further illustrate the invention the following examples are given. However, the scope of the invention is not intended to be limited to the particular compounds and proportions recited therein.

EXAMPLE 1

Hexamethylene diammonium-o-phenylenediacetate was prepared in the following manner. One mole of hexamethylene diamine was dissolved in 250 ml. of water. This solution was then added with stirring to an aqueous slurry of one mole of ortho-phenylenediacetic acid in 240 ml. of water, followed by heating to dissolve the reactants. The resulting solution was treated with activated carbon and celite filter-aid, and filtered. Then 1 ½ liters of ethanol was added, and the solution cooled overnight in an ice box at from 0° – 5° C. to induce crystallization. The precipitated salt was filtered and dried to give a 77.5 percent yield.

EXAMPLE 2

Copolymers having the compositions designated in Tables I and II were prepared by heating together in water appropriate amounts of either hexamethylene diammonium adipate or 11-aminoundecanoic acid with the salt of Example 1 in a stainless steel nylon polymerizer to a temperature of 220° C. and a pressure of 250 p.s.i., removing water at a temperature of 220° C. – 243° C. while maintaining a pressure of 250 p.s.i., then reducing to atmospheric pressure during 25 minutes while increasing the temperature to 280° C., and finally holding the temperature at from 280° C. to 300° C. for a period of 30 minutes. Mono-filaments were spun from the polymerizer onto a Universal take-up and further drawn over a 50° C. – 90° C. hot pin to a denier of approximately 10. The following abbreviations:

$$66 = -NH(CH_2)_6NH\overset{O}{\overset{\|}{C}}(CH_2)_4\overset{O}{\overset{\|}{C}}-$$

$$11 = -NH(CH_2)_{10}\overset{O}{\overset{\|}{C}}-$$

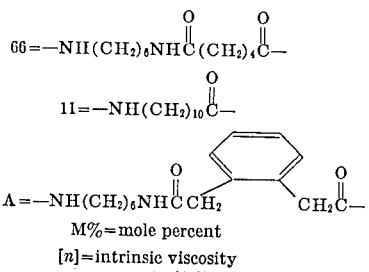

$$6OPDAA = -NH(CH_2)_6NH\overset{O}{\overset{\|}{C}}CH_2 \quad CH_2\overset{O}{\overset{\|}{C}}-$$

M% = mole percent
[n] = intrinsic viscosity are used in expressing the data which were obtained from physical measurements of the monofilaments. The data are given below.

TABLE I

| Composition | Color | [n] m-cresol | average of melting pt. range |
|---|---|---|---|
| 100% 66 | Colorless Opaque | 1.05 | 264.5°C. |
| 100% 11 | Colorless Opaque | 0.76 | 185.5°C. |
| 99.75M% 66–0.25M% 6OPDAA | Pink Opaque | 1.08 | 260.0°C. |
| 99M% 66–1.0M% 6OPDAA | Pink Opaque | 0.96 | 261.5°C. |
| 95M% 66–5M% 6OPDAA | Red Opaque | 0.97 | 257.5°C. |
| 90M% 66–10M% 6OPDAA | Red Transparent | 0.77 | 255.5°C. |
| 99M% 11–1.0M% 6OPDAA | Pink Opaque | 0.94 | 190.5°C. |

TABLE II

Color Data

| Composition | % Brightness | Purity | Dominant Wave Length (A) |
|---|---|---|---|
| 100% 66 | 46.58 | 15.6 | 5750 |
| 99.75M% 66–0.25M% 6OPDAA | 33.25 | 10.6 | 5980 |
| 99M% 66–1M% 6OPDAA | 21.96 | 30.9 | 6080 |
| 90M% 66–10M% 6OPDAA | 7.13 | 40.2 | 6180 |
| 99M% 11–1M% 6OPDAA | 20.66 | 26.2 | 5910 |
| 95M% 66–5M% 6OPDAA | 13.38 | 34.8 | 6100 |

The terms brightness, purity and dominant wave length have their usual significance. The data show that red-colored polyamides having a dominant wave length ranging from 5,980 to 6,180 angstroms are obtained with o-phenylenediacetic acid which eliminates the necessity of subsequent coloring operations of the shaped polyamide and which also overcomes the difficulties of thermal stability and agglomeration of pigments added to polyamide salts before polymerization.

EXAMPLE 3

Copolymers having the compositions designated in Table III were prepared according to the technique and procedure used to prepare the copolymers of Example 2. Monofilaments were spun from the resulting copolymer compositions according to the procedure set forth in Example 2. The color of each monofilament was observed and is expressed in Table III. In the Table 6MPDAA and 6PPDAA represent

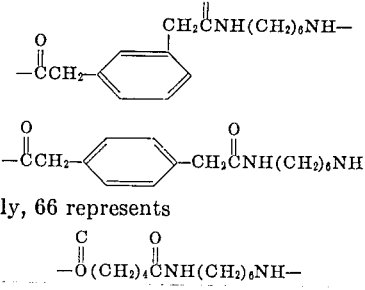

and respectively, 66 represents $$-\overset{O}{\overset{\|}{C}}(CH_2)_4\overset{O}{\overset{\|}{C}}NH(CH_2)_6NH-$$

TABLE III

| Composition | Color Observed |
|---|---|
| 66 100% (control) | Colorless - opaque |
| 95M% 66–5M% 6MPDAA | Colorless - opaque |
| 90M% 66–10M% 6MPDAA | Colorless - opaque |
| 95M% 66–5M% 6PPDAA | Colorless - opaque |
| 90M% 66–10M% 6PPDAA | Colorless - opaque |

The data in Table III show that nylon 66 modified to with either meta- or para-phenylenediacetic acid is colorless and has the same appearance as unmodified nylon 66.

Although the invention has been illustrated with reference to monofilaments, the polyamides embodied herein may also be used to prepare red-colored films, molding resin and the like. Further, nylons other than nylon 66 and nylon 11 may be modified with o-phenylenediacetic acid to provide red-colored nylons; for example, nylon 6/10, nylon 6, nylon 8/10, nylon 6/9 and the like can also be modified with o-phenylenediacetic acid according to the procedure outlined in Example 2 to provide the respective red-colored nylon.

I claim:

1. A synthetic, linear, fiber-forming polyamide having a dominant wave length between about 5,900 and 6,200 angstroms and consisting of (A) from 0.01 mole percent to 10 mole percent of recurring units of the structure $$-\overset{O}{\overset{\|}{C}}CH_2 \quad CH_2\overset{O}{\overset{\|}{C}}NHRNH-$$

where R is a saturated, unbranched, alkylene radical having from four to 14 carbon atoms, and (B) from 99.99 mole percent to 90 mole percent of recurring units selected from the group consisting of

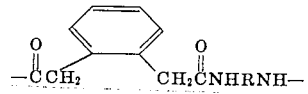

and

wherein R, R' and R'' each represents a $-(CH_2)_n-$ radical in which $n$ is a number from 4 to 12.
2. The polyamide of claim 1 wherein R is a $-(CH_2)_6-$ radical, R' is a $-(CH_2)_4-$ radical and R'' is a $-(CH_2)_{10}-$ radical.
3. The polyamide of claim 1 wherein R is $-(CH_2)_6-$ and (B) is
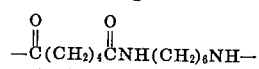
4. The polyamide of claim 1 wherein R is $-(CH_2)_6-$ and (B) is
$$-\overset{O}{\underset{\|}{C}}(CH_2)_{10}NH-$$
* * * * *